United States Patent
Zhou

(10) Patent No.: US 7,988,338 B2
(45) Date of Patent: Aug. 2, 2011

(54) OPTICAL TRANSFORMATION DEVICE

(75) Inventor: Jian-Lin Zhou, Dong-guan (CN)

(73) Assignee: MIG Technology Inc., Taipei (TW)

( * ) Notice: Subject to any disclaimer, the term of this patent is extended or adjusted under 35 U.S.C. 154(b) by 270 days.

(21) Appl. No.: 12/427,334

(22) Filed: Apr. 21, 2009

(65) Prior Publication Data
US 2010/0265723 A1    Oct. 21, 2010

(51) Int. Cl.
*F21V 5/00* (2006.01)

(52) U.S. Cl. .......... 362/311.02; 362/800; 362/431; 362/327; 362/335

(58) Field of Classification Search .......... 362/311.02, 362/800, 326, 327, 335, 338, 431
See application file for complete search history.

(56) References Cited

U.S. PATENT DOCUMENTS

| | | | | |
|---|---|---|---|---|
| 6,050,707 A * | 4/2000 | Kondo et al. | | 362/346 |
| 7,104,672 B2 * | 9/2006 | Zhang | | 362/308 |
| 7,591,568 B2 * | 9/2009 | Park et al. | | 362/311.01 |
| 7,674,018 B2 * | 3/2010 | Holder et al. | | 362/311.06 |
| 7,857,497 B2 * | 12/2010 | Koike et al. | | 362/545 |
| 2002/0080615 A1 * | 6/2002 | Marshall et al. | | 362/333 |

* cited by examiner

*Primary Examiner* — Laura Tso

(57) ABSTRACT

The present invention relates to an optical transformation device, and more particularly to an optical transformation device able to transform a projected light beam from a spot light source to form rectangular projection surfaces, which primarily includes a refracting body composed of an emergent surface structured from a combination of a plurality of optical surfaces and an incident surface configured as a concave spherical surface. Two reflecting surfaces located at two sides of the meridian of the emergent surface enable the luminous flux of incoming light to completely impinge upon the refracting body, and the interactive effect from the combined optical surfaces transforms the light shape of a light beam from a spot light source, and is projected to produce an almost rectangular shaped illumination projection surface.

4 Claims, 9 Drawing Sheets

OPTICAL TRANSFORMATION DEVICE

BACKGROUND OF THE INVENTION (a) Field of the Invention

The present invention provides an optical transformation device able to transform a projected light beam from a spot light source to form rectangular projection surfaces, in which the transformation device transforms a three-dimensional conical illumination light shape into a pyramid shape, thereby enabling illuminating projection surfaces almost equal to a rectangular plane.

(b) Description of the Prior Art

The illumination angle of a light beam emitted by illuminating apparatus must be standardized, only then can the luminous flux be made to effectively converge on projection surfaces requiring illumination. For example, a traditional light bulb must use a lampshade for the purpose of backlight reflection, thereby enabling a light beam to converge towards the required illumination surface (projection surface). Moreover, recently, light beams are produced from diode light emitting devices, in which a microminiature reflecting surface is first located at the inner rear of a diode light emitting crystal body, thereby enabling the light beam produced by the crystal sphere to be projected frontward. In addition, because the curvature specifications of the reflecting surface enables the light beam produced by the light-emitting diode to be effectively controlled at the required angle, such as 15, 30, 45, 60 degrees, and which emitting angle to use can be decided upon according to requirements of the location where implemented.

Regardless of whether a traditional light bulb or the more recent LED (light-emitting diode) light source is used, the stimulated light spot is a spot light source, and the light shape, after reflection from a reflecting cover, is conical in form, moreover, the illumination projection surface mapped out is either a circular area or an ellipsoidal area. If implemented in a particular location, such as a street or road surface or square floor space of a home, in order to effectively assemble a luminous flux of the light source for use thereof, the shape of the light beam must be transformed, such as transforming the light shape into a pyramid shape, thereby enabling specifying the bottom surface of the light beam (projection surface) to be rectangular or square shaped.

SUMMARY OF THE INVENTION

The primary objective of the present invention lies in a transformation device, comprising a refracting body composed of an emergent surface structured from a combination of a plurality of optical surfaces, and an incident surface configured as a concave spherical surface. When a light beam produced by a spot light source enters the spherical surface, curvature of the spherical surface is used to prevent critical angle refraction, and enables the total amount of light to enter the refracting body, as well as providing a preliminary light diffusion function. Basically, the front central surface of the emergent surface, structured from the plurality of optical surfaces, is a refracting surface. The refracting surface has two working optical axis connecting in the direction of the meridians which intersect with the optical axis of the optical curved surface. Moreover, reflecting surfaces having reflective power are respectively located at two sides of the meridian, and the two side reflecting surfaces are used to limit the included angle in relation to the two reflected beams, thereby enabling the reflected luminous flux to be limited to projection onto the required illumination area between two parallel sides of the projection surface. In addition, interaction from the two optical curved surfaces and refracting surface elongates the base length of the projection surface, and enables distribution of the illuminating beam of the spot light source to form an almost rectangular shaped illumination projection surface. Another objective of the present invention lies in reflecting surfaces on two sides of the meridian of the emergent surface of the refracting body being configured perpendicular to the refracting surface, and the two reflecting surfaces have an internal reflection function, which can be combined with inward reflection films or reflection mirrors.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
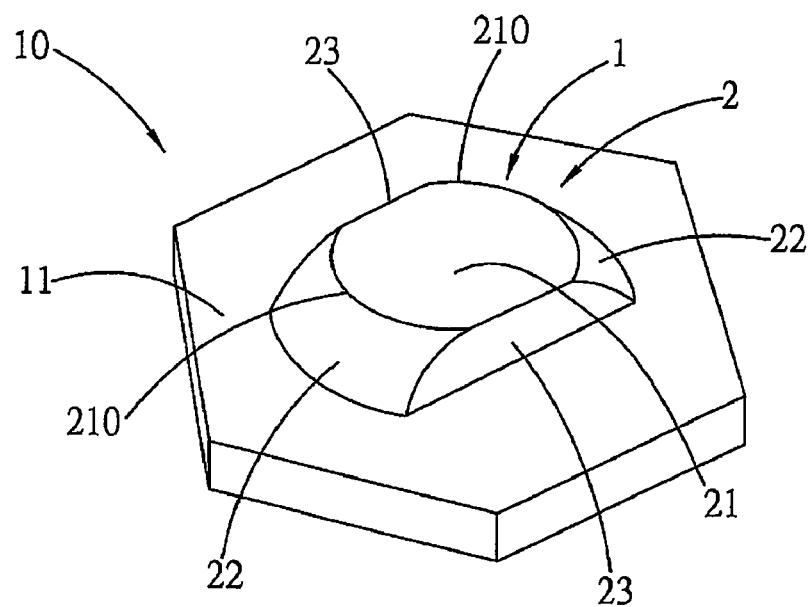
FIG. 1 is an external appearance of a refracting body of the present invention.
Figure 2:
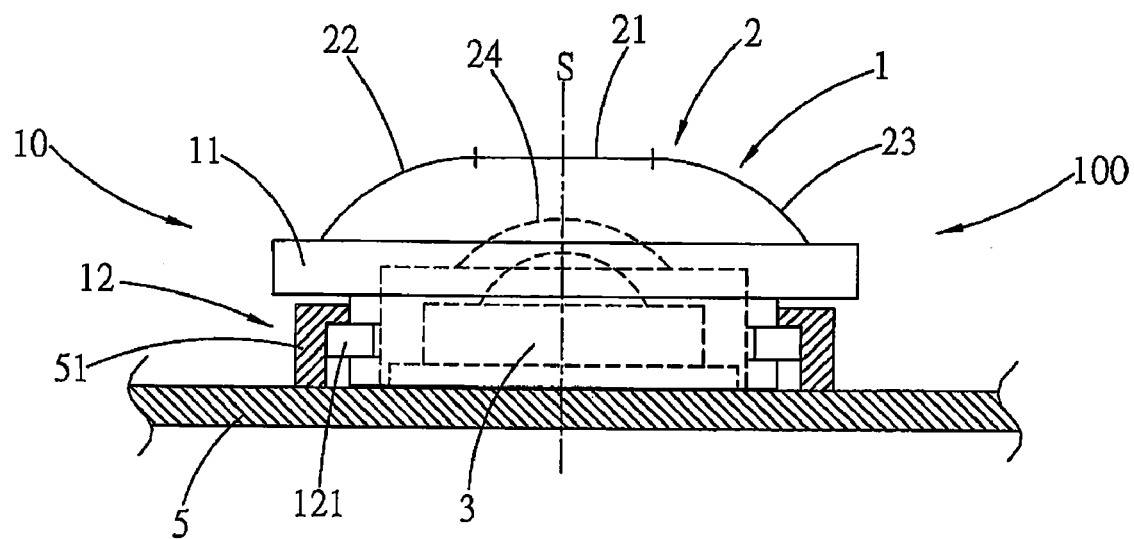
FIG. 2 is a side structural view of the refracting body assembled to a light stimulating unit to form a light projecting unit of the present invention.

Regarding the detailed specification of the embodiments of the present invention, first refer to FIGS. 1 and 2, which show a transformation device 10 of the present invention primarily structured from a refracting body 1 of high light transmittance, the radial periphery of which is joined to a baseplate 11. The baseplate 11 has an outward connecting function, and serves as the basis for installation. The external surface of the refracting body 1 is an emergent surface 2, which is formed from a combination of a plurality of optical surfaces, wherein a central optical surface comprising one of the plurality of optical surfaces of the emergent surface 2 is a horizontal refracting surface 21 parallel to the baseplate 11. Related meridian directions of the surface of the refracting surface 21 are based on the plane of the refracting surface 21 as the standard, and edge lines 210 are lines of intersection with the refracting surface 21 that respectively adjoin to two optical curved surfaces 22. In addition, two sides of the related meridians of the refracting body 1 are respectively configured with a reflecting surface 23 in perpendicular correspondence with the refracting surface 21. The rear of the refracting surface 21 of the emergent surface 2 is an incident surface, and the incident surface is a concave spherical surface 24. Moreover, an optical axis S of the concave spherical surface 24 coincides with light entering the refracting surface 21, and a light stimulating unit 3 is disposed externally contiguous to the concave spherical surface 24 coinciding with the optical axis S.

A bottom portion of the baseplate 11 is fitted with an assembling portion 12, and the assembling portion 12 is joined to a circuit board 5 using joining members 51. The joining members 51 function to enable forming a dry assembly on fastening tenons fitted on the assembling portion 12. In addition, bonding or other secure fastening means can be used between the assembling portion 12 and the circuit board 5 to achieve assembly thereof, the most important factor being to enable the optical axis S of the refracting body 1 to maintain alignment with the center of the light projecting portion of the light stimulating unit 3.

A light projecting unit 100 is formed after the transformation device 10 of the present invention is joined to the light stimulating unit 3. In addition, an electrical connection is established between the light stimulating unit 3 and the circuit board 5, thereby enabling the light stimulating unit 3 to obtain electric driving power, the electric power is provided by means of electrical connection of the circuit board 5 with a power source. The electrical connection means is generally known technology, and thus no further details are provided.

Figure 3:
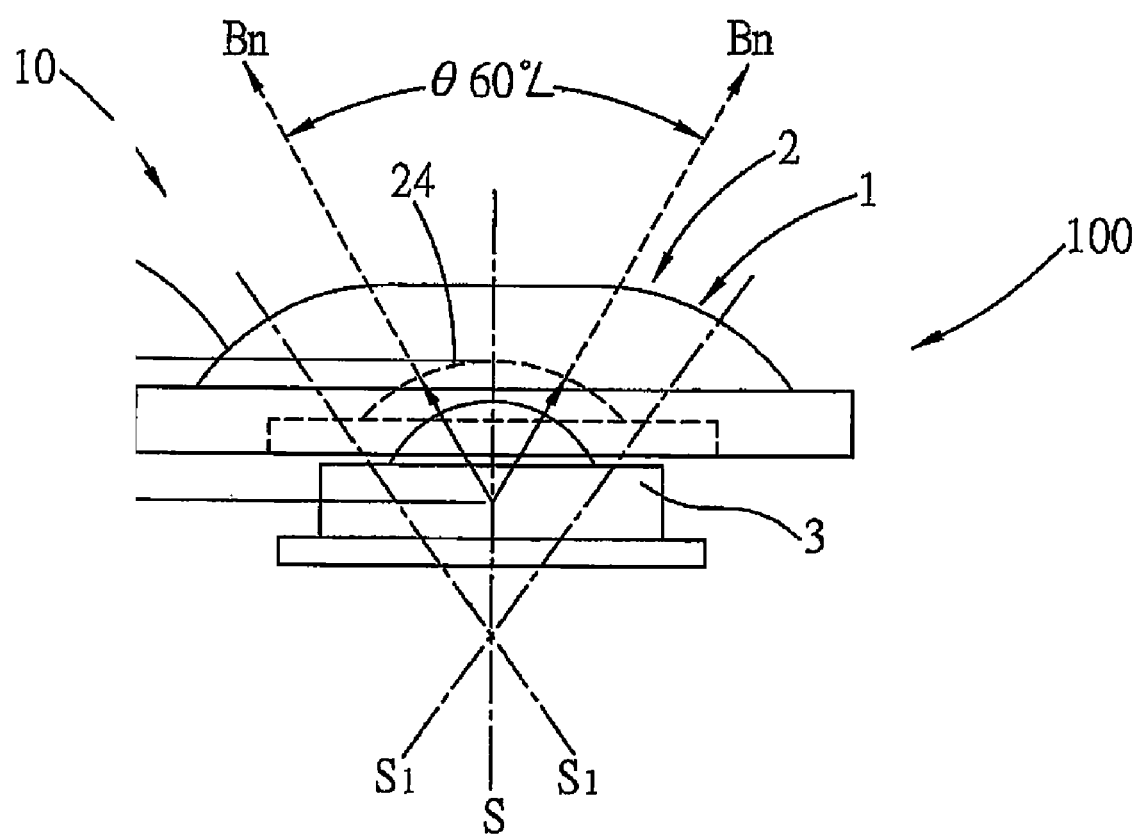
FIG. 3 is a schematic view depicting the light path of the refracting body assembled to the light stimulating unit forming the light projecting unit of the present invention.

After assembling the aforementioned transformation device 10 to the light stimulating unit 3 to form the light projecting unit 100 (as depicted in FIG. 3), then a light beam produced by the light stimulating unit 3 is able to be incident upon the concave spherical surface 24 of the transformation device 10, and because the curvature of the concave spherical surface 24 is used to surround the stimulated light emergence angles of the light stimulating unit 3, thus, the total amount of light produced by the light stimulating unit 3 is able to enter the interior of the transformation device 10 through the curvature range of the concave spherical surface 24, thereby preventing problems of critical refraction angle causing pointless reflection loss of the light beam, and enabling the total amount of luminous flux to have functionality within the transformation device 10. If the light stimulating unit 3 is configured as a spot light source, which has one emission angle, for example, <60 degrees, and under circumstances whereby because the optical path length L of the concave spherical surface 24 does not exceed the distance to the light source, thus, the two oblique sides of the emission angle are positioned within the spherical range of the concave spherical surface 24, causing a light beam Bn of the stimulated light to completely pass through the concave spherical surface 24 and enter the refracting body 1. In addition, the emitted light beam passing through the normal line relationship of the concave spherical surface 24 enables the interior of the transformation device 10 to achieve initial light diffusion according to the principle of refraction, and cause quadrant uniform divergence, which refracts from the emergent surface 2 after refraction from the transformation device 10.

Light entering the optical axis S of the aforementioned refracting surface 21 coincides with the optical axis of the concave spherical surface 24, two optical axis S1 of the two optical curved surfaces 22 intersect in the incident surface direction and coincides with the optical axis S of light traveling through the refracting surface 21.

Figure 4:
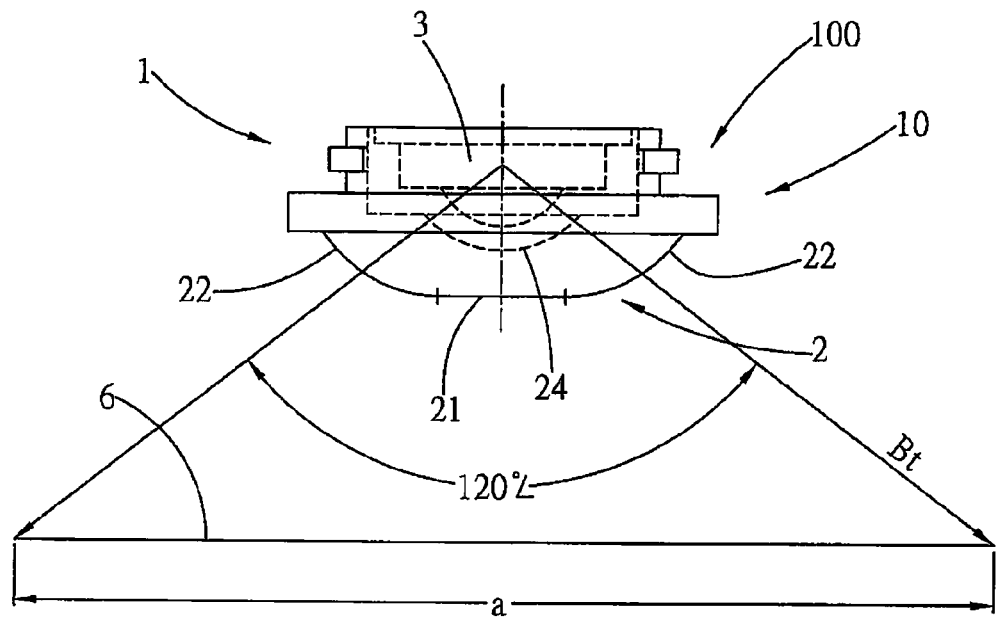
FIG. 4 is side view of the meridian position of the refracting body according to the present invention.
Figure 5:
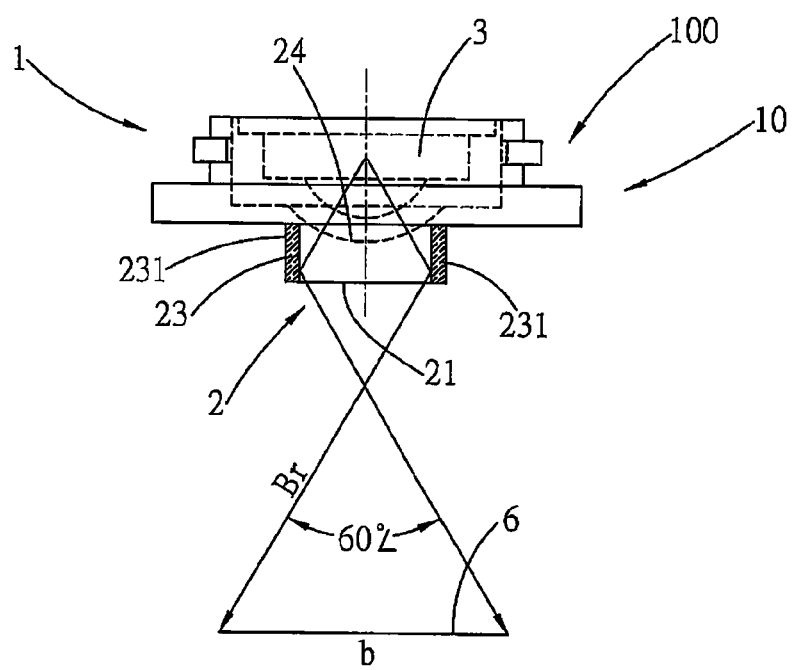
FIG. 5 is front view of the meridian position of the refracting body according to the present invention.

Referring to FIGS. 4 and 5, which show the light projecting unit 100 formed after joining the transformation device 10 to the light stimulating unit 3 of the present invention, and the emergent surface 2 from a side view direction of the meridian of the transformation device 10 is formed from a structural combination of the refracting surface 21 and the optical curved surfaces 22 joined to the two sides thereof, thereby forming three optical surfaces. Accordingly, the spot light source produced by the light stimulating unit 3 enters the interior of the transformation device 10 from the concave spherical surface 24, and then passes through the emergent surface 2 after refractive transmission. Based on the planar effect of the refracting surface 21 and the curvature effect of the optical curved surfaces 22, the light beam produced by the light stimulating unit 3 refracts to form a refracted light beam Bt of expanded form, and the three optical surfaces are used to expand and form a light projection angle close to 120 degrees, which forms the basis for long sides a of the rectangular projection surface 6 when projected onto a projection surface 6.

Referring again to FIG. 5, which shows the light projecting unit 100 formed after joining the transformation device 10 to the light stimulating unit 3 of the present invention, wherein the light beam produced by the light stimulating unit 3 passes through the concave spherical surface 24 and enters the interior of the transformation device 10 to undergo refraction. The confining specification of the reflection angles of the reflecting surfaces 23 configured at the two sides of the transformation device 10 causes the light beam produced by the light stimulating unit 3 to be subjected to the reflecting effect of the reflecting surfaces 23 to form a reflected light beam Br. The reflected light beam Br then projected onto the surface of the projection surface 6 forms the basis for short sides b of the rectangular projection surface 6, and the projection area obtained is the long side multiplied by the short side.

From the viewing direction of FIG. 5, the emergent surface 2 of the transformation device 10 is structured from the refracting surface 21 and the two side reflecting surfaces 23; the reflecting surfaces 23 basically being optical surfaces having high reflectivity. Moreover, reflecting elements 231 can be joined to the reflecting surfaces 23 by means of galvanized plating or attachment of reflectors (not shown in the drawings) to strengthen inward reflectivity, thereby enabling total reflection of the light beam produced by the light stimulating unit 3 at the reflecting surfaces 23, and, through the function of the reflecting surfaces 23, complete reflection of the luminous flux of the light beam produces the reflected light beam Br, or is directly refracted through the function of the refracting surface 21.

Figure 6:
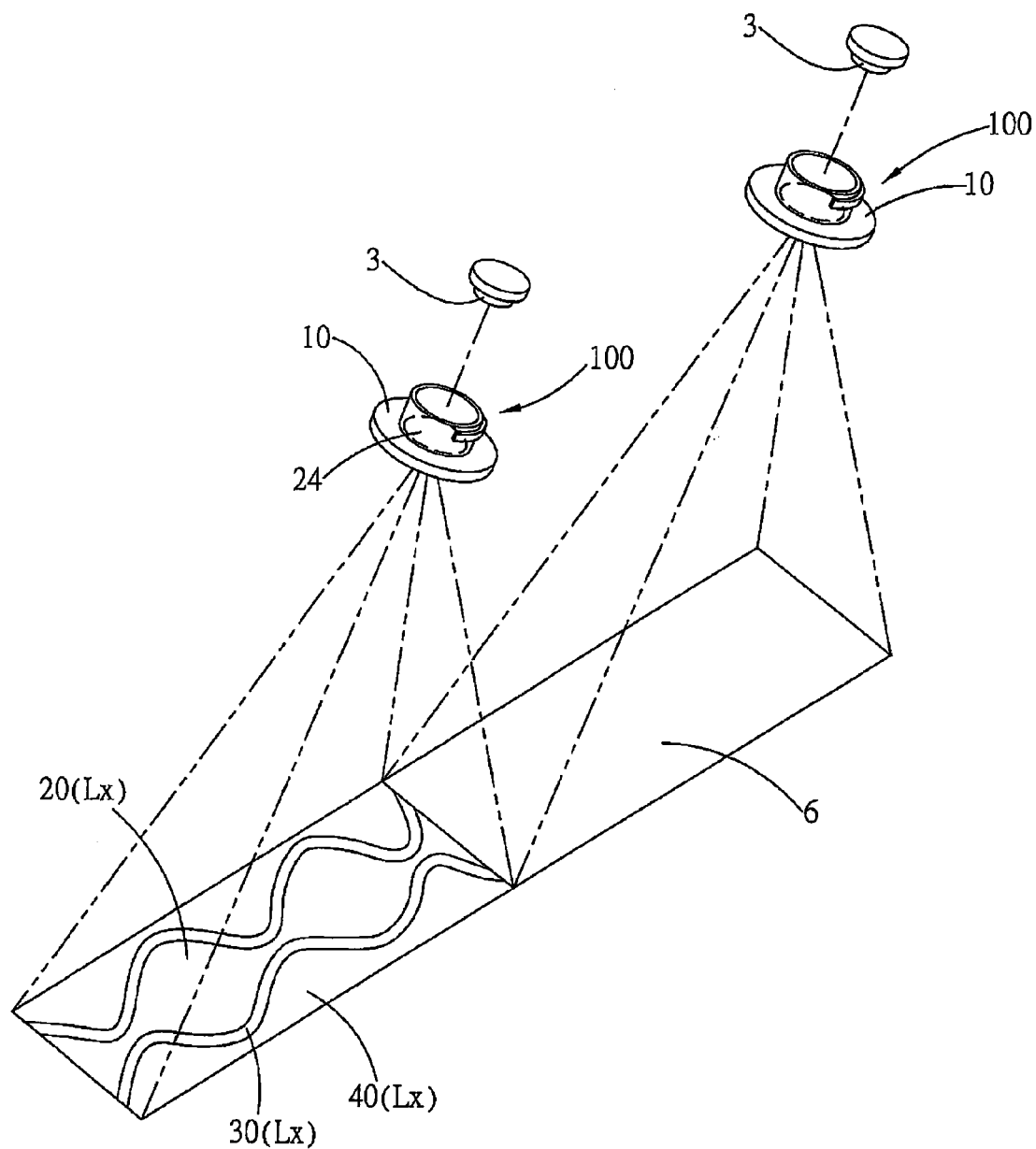
FIG. 6 is a schematic view depicting distribution of illumination areas of rectangular projection surfaces after transformation by the transformation device of the present invention.

Referring to FIG. 6, which shows an arrangement of more than two of the light projecting units 100 of the present invention, each of which is formed by joining the transformation device 10 to the light stimulating unit 3, and can be installed together at a certain height to produce even larger projection surfaces 6. Accordingly, installing a plurality of the light projecting units 100 at a certain height enables arranging the lengths or widths of the projection surfaces 6 to form a matrix structure. Moreover, the constructed projection surfaces 6 can be made to form an overlapping state, thereby increasing illumination brightness of the projection surface 6, as well as enabling a more uniform brightness. The projection surfaces form rectangular projection areas after undergoing the effects as depicted in FIGS. 3 and 4, and the rectangular projection areas can be used to illuminate street surfaces, or projected onto indoor rectangular surfaces for use thereof.

After specification of the projection surfaces 6 from the effects of FIGS. 5 and 6, then optical density thereof is concentrated on the central longitudinal line and the two long sides of the projection surfaces 6. Moreover, the projection surface 6 can be roughly differentiated into three illuminance areas, that is three different lumen areas, basically including the two sides having an illuminance of 40 (lux), decreasing progressively towards the center having an illuminance of 30 (lux) and 20 (lux). Furthermore, after overlapping with the projection surface 6 of another of the light projecting units 100, light density and brightness uniformity is strengthened between the three areas.

Figure 7:
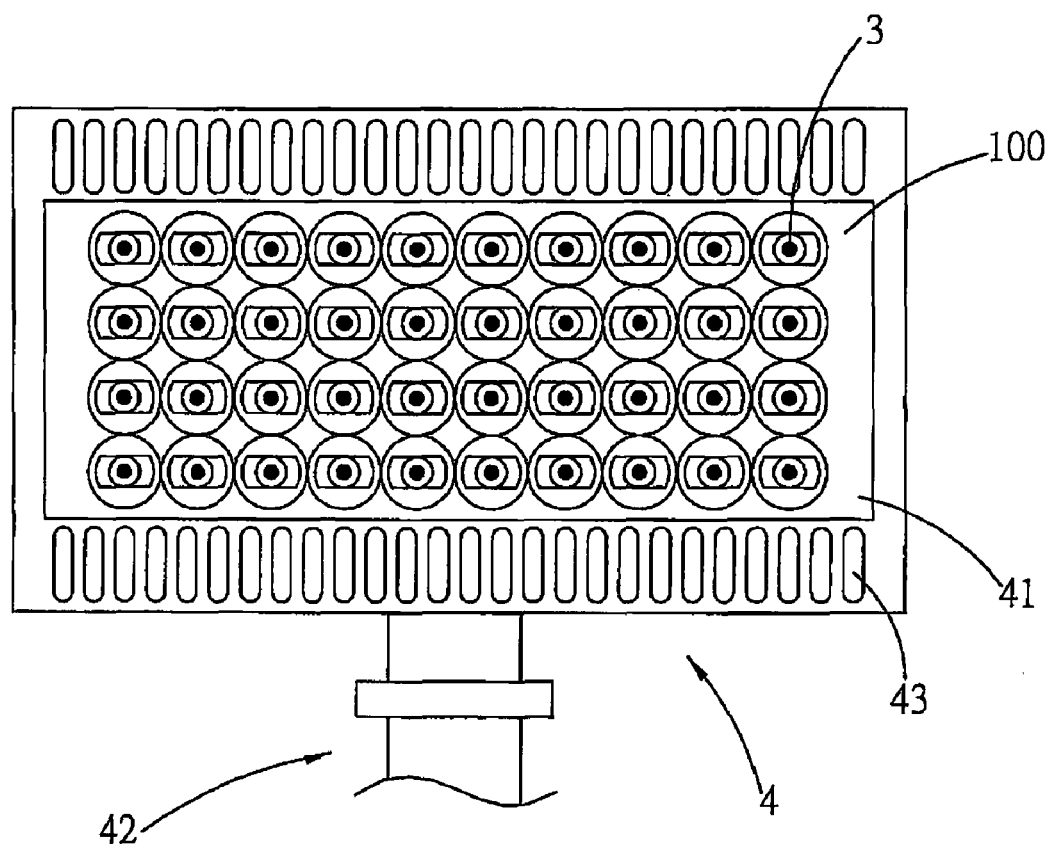
FIG. 7 is a schematic view depicting a light emitting surface of the present invention implemented in a light fixture.
Figure 8:
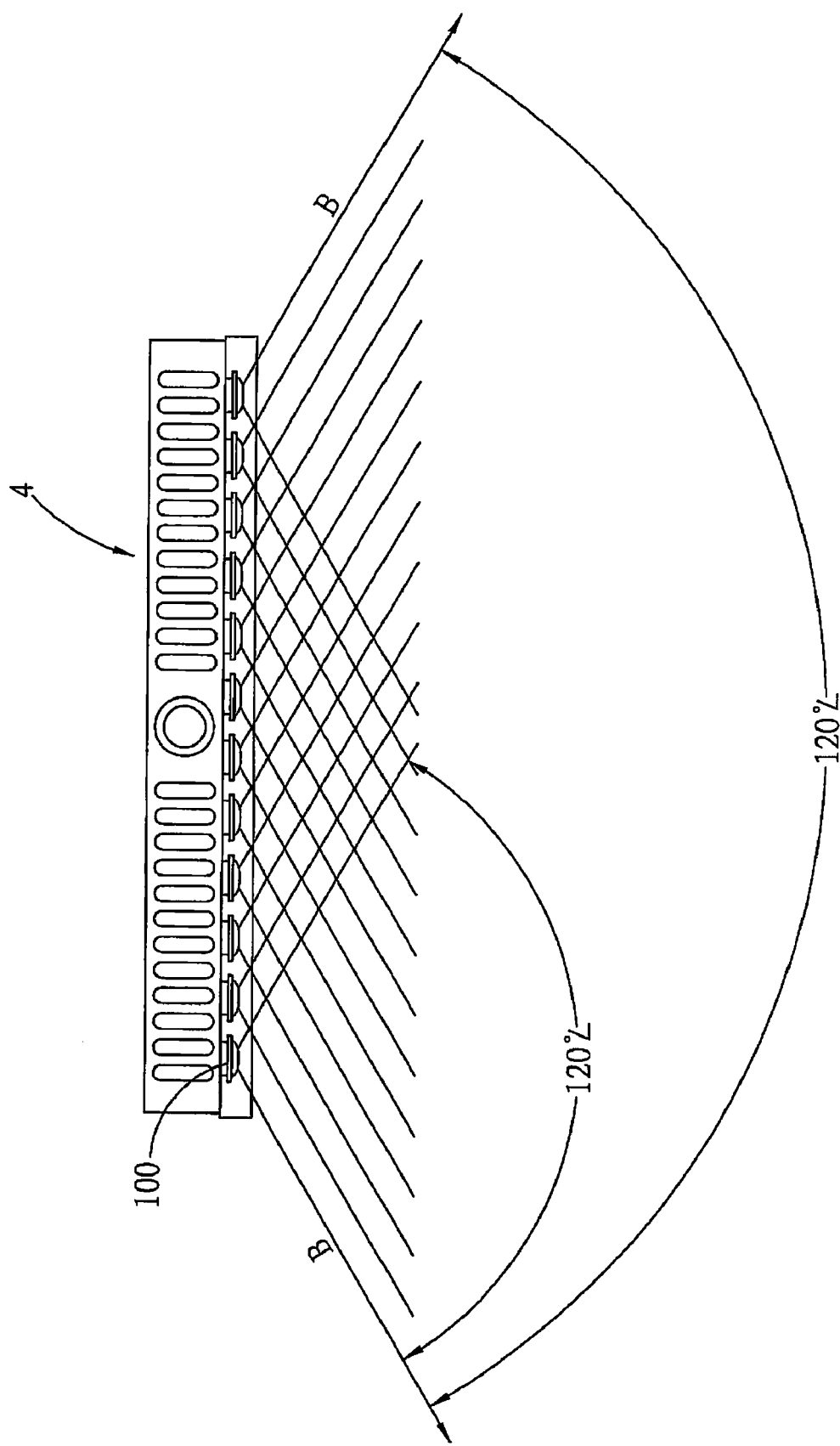
FIG. 8 is a side view of the embodiment depicted in FIG. 7.

The present invention uses the aforementioned principle as the means to accumulate lumen for implementation in an illuminating apparatus for use thereof. Referring to FIGS. 7 and 8, which show a plurality of the light projecting units 100 arranged on the surface of a light emitting surface 41 of a light fixture 4 in a matrix fashion, wherein each of the light projecting units 100 has its associated optical illumination function of producing the projection surface 6 from the light stimulating unit 3 as depicted in FIG. 6. The plurality of light projecting units 100 are assembled on the circuit board 5 similar to FIG. 2, moreover, a heat dissipation mechanism must be provided. Hence, each edge of the light emitting surface 41 of the light fixture 4 is provided with heat dissipating holes 43, thereby enabling an exchange of internal heat with the external cold air to achieve heat dissipation effectiveness. A connecting portion 42 is fitted to one side of the light fixture 4 for fixing to a wall surface or high fixture to enable projecting light illumination to the ground.

Referring again to FIG. 8, after disposition of the plurality of light projecting units 100 in a matrix arrangement, from a lateral view of the disposition, the distribution of the plurality of light projecting units 100 in the interior of the light fixture 4 can be seen, and the illumination angle of a light beam B associated with each of the light projecting units 100 is 120 degrees. The light projecting units 100 are assembled abreast in a front-to-back sequential arrangement, thus, the angle of the respective refracted light beam of each of the light projecting units 100 is the same, and the light paths of the light beams B sequentially overlap alongside each other. Moreover, after assembling the plurality of light projecting units 100, the light emitting angle of the entire light fixture 4 is also 120 degrees, by inference, the overall illumination angle of the meridian directions of the light fixture 4 is also 60 degrees similar to the specification depicted in FIG. 5. Accordingly, using the implementation depicted in FIG. 7, a plurality of the light projecting units 100 can be assembled to enable forming a relatively higher illuminance having functionality for external lighting.

Figure 9:
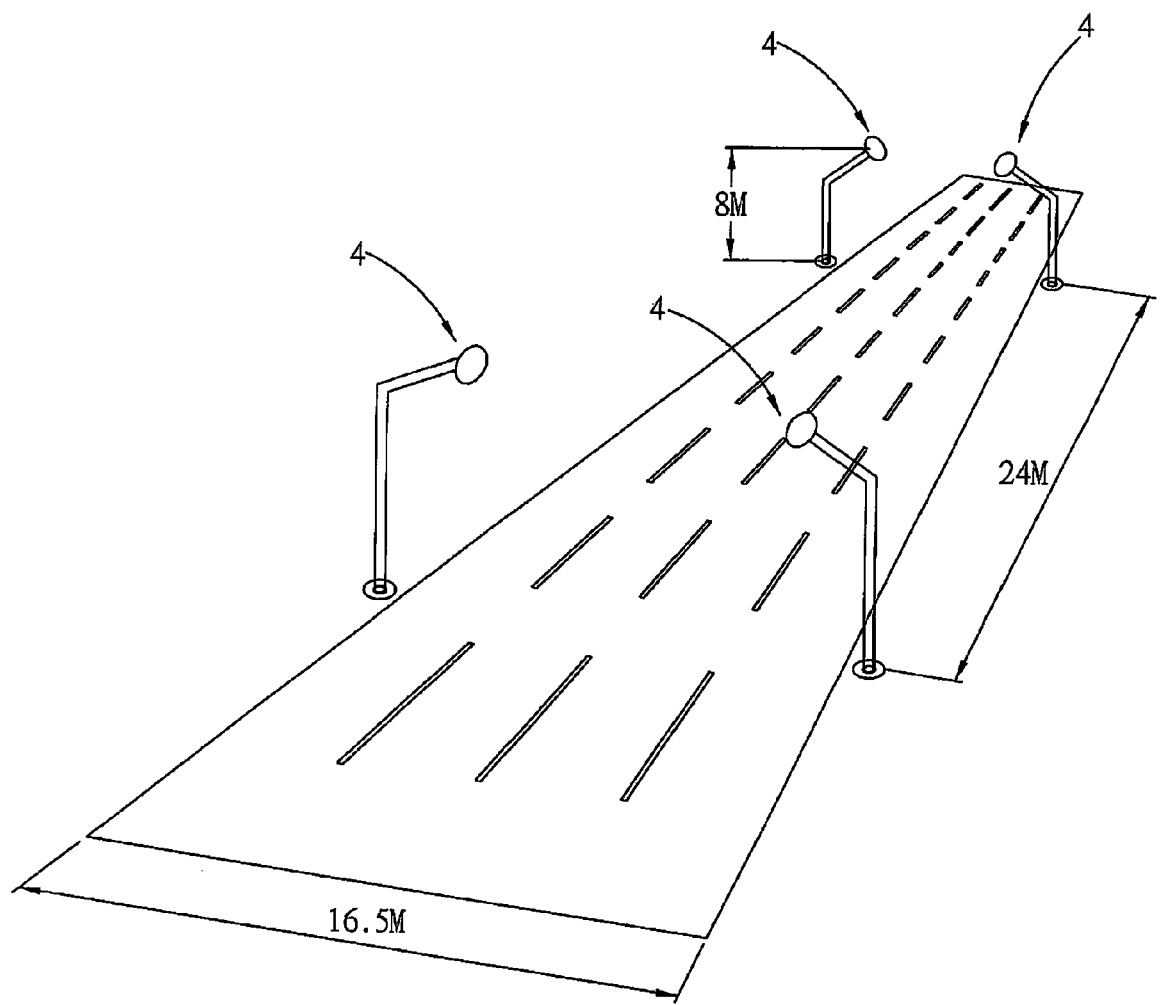
FIG. 9 is a schematic view depicting a simulation test of the present invention applied on a road.

Referring to FIG. 9, the present invention is also applicable for use on ground surface areas provided with two parallel borderlines, such as use on roads, and based on pilot studies carried out with the present invention, on a standard four lane road, 16.5 meters wide, the light fixtures 4 can be installed at 24 meter distances mutually facing along the two borderlines of the road, and illuminating height of the light fixtures 4 is 8 meters.

Figure 10:
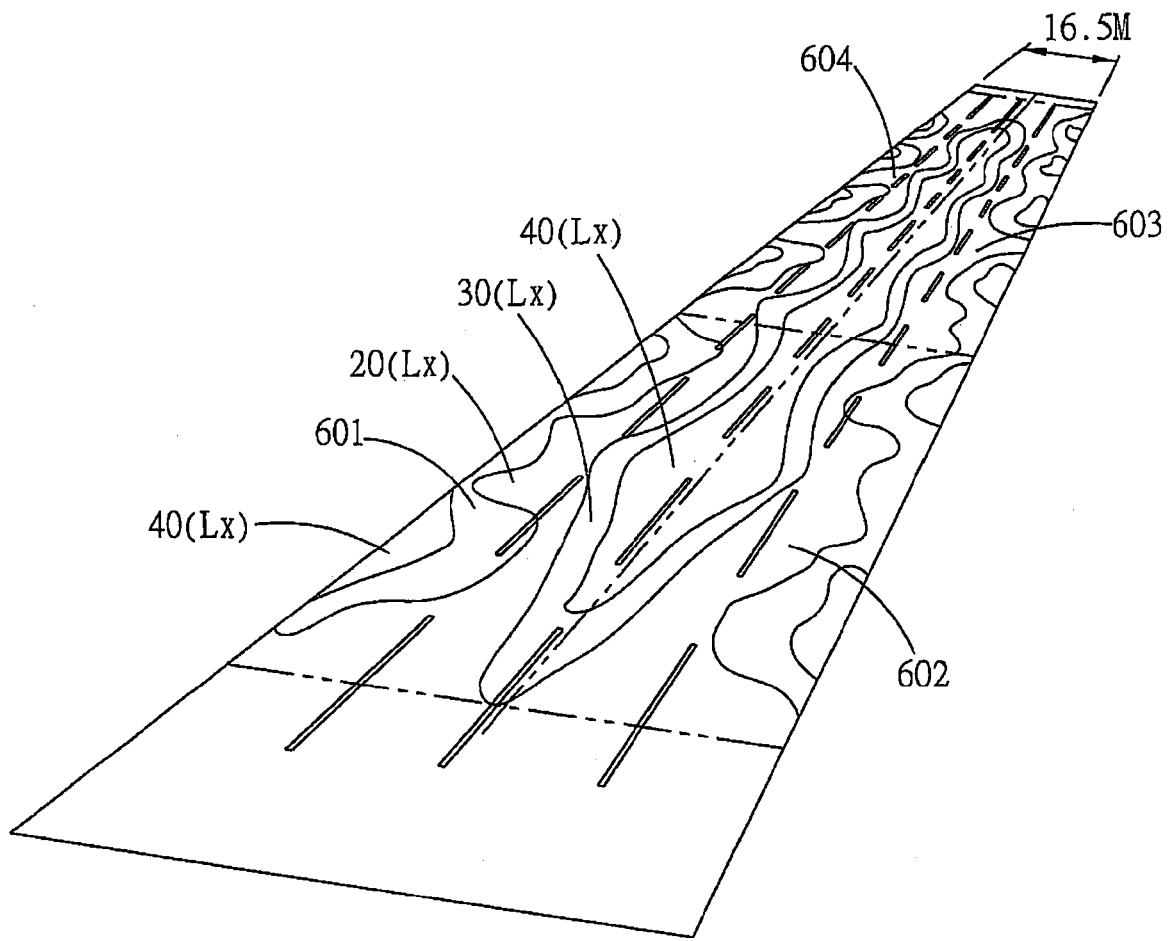
FIG. 10 is a distribution diagram of the illumination areas produced after implementing FIG. 9.

Referring to FIG. 10, after implementation of FIG. 9, the light fixtures 4 are able to illuminate required projection surfaces 601, 602, 603, 604 on the road surface. The combined illumination area of the projection surfaces 601, 602, 603, 604 is used to compose an illumination area sufficient to cover the requirements of the road surface area.

Similar to the projection surfaces 6 of FIG. 6, it can be similarly inferred that the distribution of light density of the projection surfaces 601, 602, 603, 604 projected from the respective light fixtures 4 (as depicted in FIGS. 9 and 10) forms three different light and shade sub-area effects.

The illumination angle of the light fixture 4 can be adjusted to cause each of the projection surfaces 601, 602, 603, 604 to overlap. Accordingly, pilot studies with the present invention have shown that when the projection surfaces 601, 602, 603, 604 are adjusted to produce projection areas of more regular light density, then higher light density is concentrated in the center of the road, having an illuminance reaching 40 (lux), and the two sides of the road can similarly achieve a illuminance of 40 (lux). Hence, implementation of such a configuration on a 16.5 meter wide, four lane standard road is sufficient to meet the navigational needs of drivers at night, and enables achieving a concrete lighting implementation for a road or street. Because the simulation test for the present invention was implemented on a 16.5 meter wide, four lane standard road, if implemented on a street less than 16.5 meters wide, or 8 meter wide streets, then the light fixtures 4 need only be implemented on a single side along the street route, and there is no need for symmetrical disposition along the two sides of the street.

Figure 11:
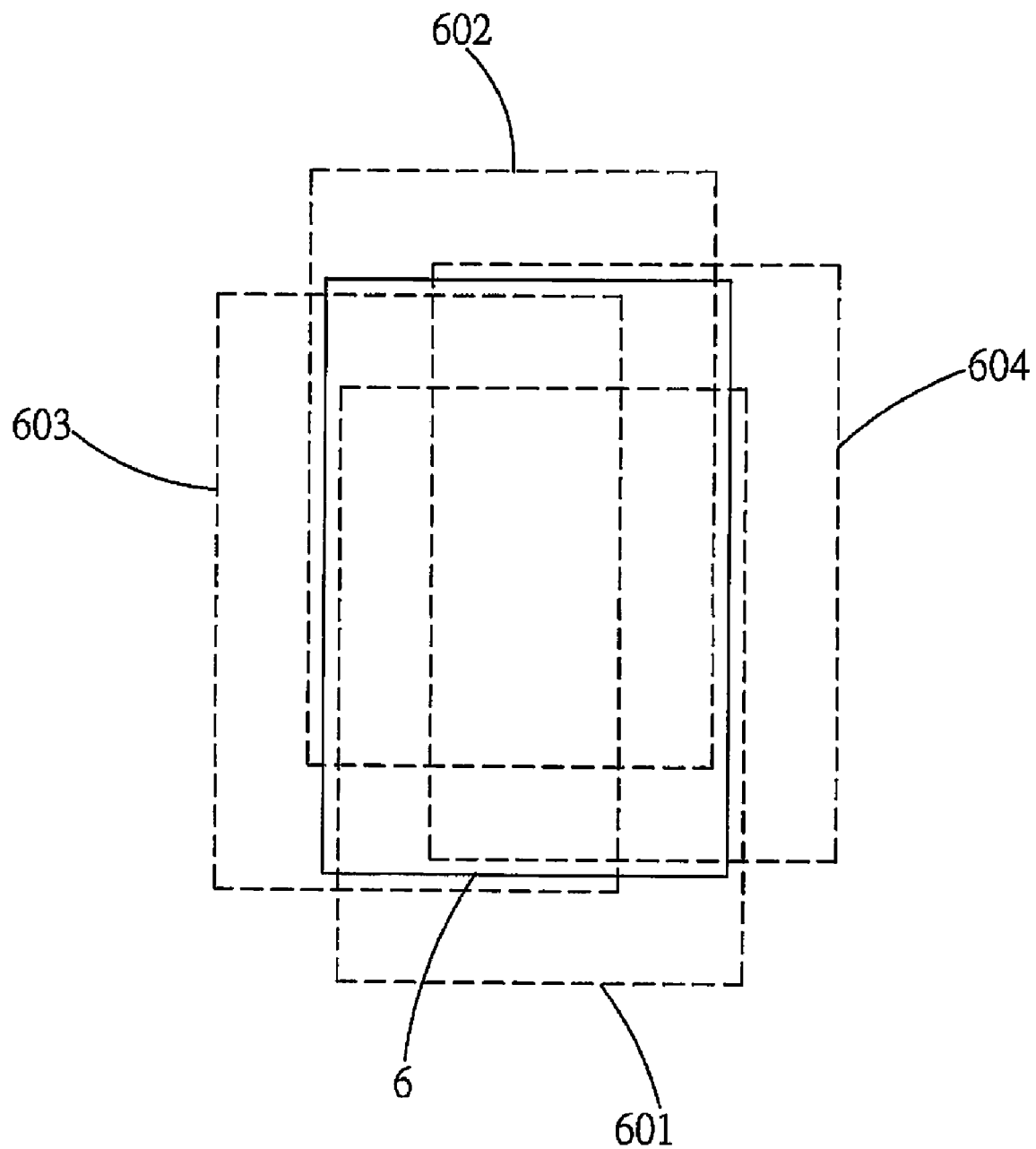
FIG. 11 is a schematic view depicting a single projection surface of extremely uniform and high brightness obtained by overlapping a plurality of the projection surfaces according to the present invention.

Under the conditions depicted in FIG. 6 of the present invention, and under circumstances whereby a plurality of the light fixtures 4 are implemented, and each of the projection surfaces 6 are combined, then the projection surfaces 6 can be made to form an optical display of extremely uniform brightness (as depicted in FIG. 11). A plurality of the light fixtures 4 can be implemented on a single projection surface 6, and after changing the projection angle of each of the light fixtures 4, then projection effectiveness producing extreme uniform brightness and accumulated high lumen can be achieved by overlapping association of the light beams, such as overlapping the projection surfaces 601, 602, 603, 604 close to an identical angular position, then, as for the projection areas of FIG. 6, the projection surface 6 can be made to obtain an optically illuminated surface of extremely uniform brightness and high density through overlapping of the projection surfaces 601, 602, 603, 604 according to actual requirements of the projection surface 6.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An optical transformation device, more particularly a light shape transformation device able to transform the light from a spot light source and produce a rectangular projection surface, wherein:

the transformation device is a refracting body, and the refracting body is provided with an incident surface and an emergent surface, wherein the incident surface is a concave spherical surface, and the emergent surface is formed from a combination of a plurality of optical surfaces, the combination of a plurality of the optical surfaces comprises:

a refracting surface, the optical axis of the refracting surface coincides with the working optical axis of the concave spherical surface;

two optical curved surfaces, configured to join with the surface edge lines along the meridian direction of the refracting surface, the extended point of intersection of the two axis is positioned in the direction of the incident surface, and intersects on the working optical axis;

two reflecting surfaces, located at two side positions of the associated meridian of the emergent surface, and which are angularly adjoined to two sides of the refracting surface.

2. The optical transformation device according to claim 1, wherein the reflecting surfaces are perpendicular to the refracting surface.

3. The optical transformation device according to claim 1, wherein reflecting elements are attached to the reflecting surfaces.

4. The optical transformation device according to claim 1, wherein the refracting body is radially joined to a baseplate.

* * * * *